United States Patent [19]
Harris

[11] 3,727,340
[45] Apr. 17, 1973

[54] SNAGLESS FISHING HOOK

[76] Inventor: Raymond Harris, 1030 Fourth Street, Saraland, Ala. 36571

[22] Filed: May 18, 1970

[21] Appl. No.: 38,079

[52] U.S. Cl. ..................43/43.2, 43/36, 43/44.83
[51] Int. Cl. ..............................................A01k 83/00
[58] Field of Search..................43/43.2, 43.4, 36, 43/43.16, 44.82, 44.83, 44.86

[56] References Cited

UNITED STATES PATENTS

| | | | |
|---|---|---|---|
| 117,719 | 8/1871 | Arnold | 43/44.86 |
| 454,580 | 6/1891 | Mack | 43/43.2 |
| 679,296 | 7/1901 | Clark | 43/43.2 |
| 2,124,263 | 7/1938 | Schott | 43/43.2 |
| 289,508 | 12/1883 | Dawson | 43/44.82 UX |
| 1,056,397 | 3/1913 | Bonnell | 43/36 |
| 2,514,527 | 7/1950 | Verhota | 43/44.82 |

*Primary Examiner*—Louis G. Mancene
*Assistant Examiner*—Daniel J. Leach
*Attorney*—Clarence A. O'Brien and Harvey B. Jacobson

[57] ABSTRACT

A snagless fishhook construction having four hooks, namely, a first pair of duplicate short hooks and a second pair of relatively long complemental hooks. These paired hooks are equidistant and circumferentially spaced and the yieldable free ends cross each other, are yieldingly cocked and normally weedless but are adapted to spring out when the sensitively pliant shanks are grasped by the fish. The shanks of the respective hooks are thin and flat and are readily moved toward each other when squeezed, whereupon the barbed hooks (one pair or both pairs) spring out and snare the fish.

1 Claim, 7 Drawing Figures

PATENTED APR 17 1973 3,727,340

Raymond Harris
INVENTOR.

BY Clarence A. O'Brien
and Harvey B. Jacobson
Attorneys

SNAGLESS FISHING HOOK

This invention relates to a fishhook construction which is characterized by a first pair of like short hooks encompassed by a second pair of relatively long hooks and wherein said hooks are oriented and coordinated in a manner that both pairs of hooks are normally nested together and closed in a manner to render the structure effectually snagless and are expanded and spring out to open fish catching positions when grasped and squeezed in by the fish.

An object of the herein disclosed invention is to structurally, functionally and in other practical ways improve upon prior art fishhook constructions which are characterized, generally stated, by paired fishhooks which are coordinated in a manner to provide a more satisfactory weedless or snagless hook structure.

For background purposes, it is to be mentioned at the outset of this disclosure that paired long and short fishhooks having forward ends which are integrally united and rearward ends with nested overlapping bends and pointed barbs are not new. As exemplary of the general state of the art to which the invention relates, the reader may refer to a patent issued to John Schott, U.S. Pat. No. 2,124,263, and more particularly, to a patent issued to Albert G. Mack, U.S. Pat No. 454,580. As will be hereinafter more fully appreciated, and while the prior art adaptations are analogous to the instant invention, it can be pointed out here that the stated prior patents, because the shank portions of the hooks are not thin and flat, do not and cannot achieve the highly sensitive pliant and spring action which is a significant feature of the invention herein under advisement.

Then, too, and as will be hereinafter more clearly evident, the fishhook construction featured herein has to do with four coacting equidistant circumferentially spaced hooks which are interrelated in pairs, namely, a first pair of relatively short hooks and a second pair of complemental relatively longer hooks. These hooks all have yieldingly cocked shank or tang portions which are joined to an axial stem of a line attaching eye and which are so arranged that the barbed rearward ends are sprung together in appropriate overlapping relationship and are accordingly normally closed and snagless. The barbed hooks spring to open fish snaring position and relationship when pressure is applied to the pliant and sensitively yieldable shanks or tangs of the paired hooks. When pressure is released the spring tension will automatically contract the barbed hooks whereupon they automatically assume closed guarded position and relationship.

Briefly, this invention is characterized by a simple line attaching eye which has an axially disposed hook assembling and mounted rigid stem. A first pair of relatively short hooks cooperate with a second pair of complemental relatively long hooks. All of the hooks are basically alike in construction. This is to say, the forward end of a relatively thin pliant shank is superimposed on and suitably affixed to the stem of the eye. These flat tangs are circumferentially arranged around the stem and the respective long and short hooks are thus properly paired and inherent tension of the flat pliant tangs serve to coordinate the coacting pointed barbs in overlapping properly nested closed but ready-to-function relationship.

It is self-evident that with the fishhook construction disclosed it is easy to make flies by tying feathers or bristles onto the coiled or wrapped wire which embraces the attached ends of the tangs of the paired long and short hooks. In addition, hackle or so-called decorative skirts can be slipped over and mounted on the wrapped or coiled wire.

In addition, the eye of the hook is standard and accessories such as snaps, swivels, spinners and the like can be, if desired, fastened on the eye without any adjustments. It has been found too, that with the construction under consideration here, that if the hook, that is the overall hook, strikes an object while trolling or for any other reason the hooks will be compressed and will automatically spring back into closed or guarded position and relationship. Manifestly, these and other features and advantages of the invention can be and are accomplished by the improved hook construction.

These together with other objects and advantages which will become subsequently apparent reside in the details of construction and operation a more fully hereinafter described and claimed, reference being had to the accompanying drawings forming a part hereof, wherein like numerals refer to like parts throughout, and in which:

Figure 7:
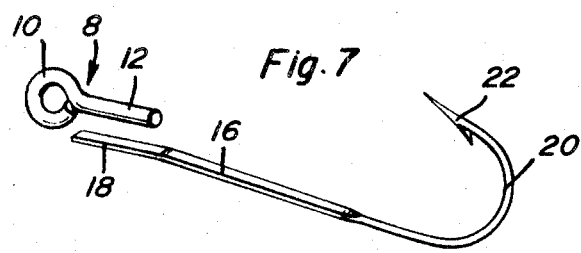

And FIG. 7 is a view in perspective showing the afore-mentioned stem-equipped eye and also showing one of the improved fishhooks.

Figure 1:
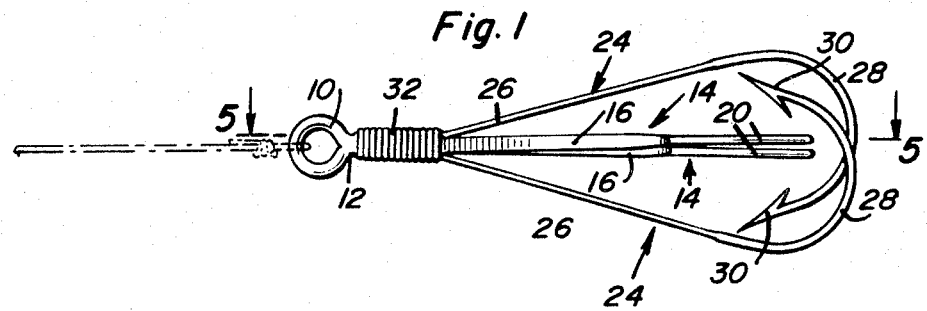
FIG. 1 is a view in elevation of paired snagless fishhook construction constructed in accordance with the principles of the present invention.
Figure 2:
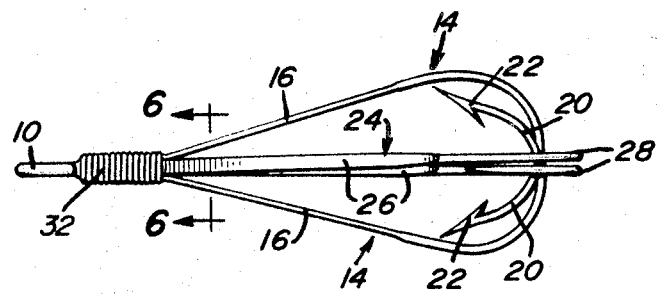
FIG. 2 is a view of the same taken at right angles to FIG. 1 and wherein, in both figures, the paired hooks are automatically sprung into closed or guarded position and relationship.
Figure 3:
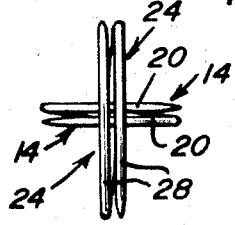
FIG. 3 is an end view of FIG. 1 observing the same in a direction from right to left.

With reference now to the views of the drawing, a significant component of the overall assemblage is the eye member referred to broadly as the line-attaching eye and denoted by the numeral 8 in FIG. 7. This component comprises a suitable eye 10 having a rearwardly extending axially positioned stem 12. It is to this simple stem that the forward ends of the four properly paired fishhooks are connected. The first pair of hooks, referred to as the relatively short hooks, is denoted by the numeral 14. These hooks are of like construction and are oriented with each other and the attaching and mounting stem 12. Each hook embodies a flexible sensitively pliant (spring steel or the like) shank which is relatively thin and flat-faced and is accordingly non-circular in transverse section. The main portion of the shank constitutes a pressure responsive tang 16 having a terminal forward end portion which is superimposed upon a surface of the stem 12 and is fused or otherwise fixedly bonded thereto (not detailed). The forward terminal end portion of each tang is denoted (FIG. 7) by the numeral 18. The terminal end portions 18 of the paired hooks 14 are fixed to the stem 12 on diametrically opposite sides. The arcuately formed bend or bent portion 20 terminates in a pointed barb 22. These bent barb-equipped ends are in overlapping relationship and the tension of the tang normally serves to maintain the turned-in barbs in closed coordinating relationship as shown in FIGS. 1 and 2. This is referred to herein as the snagless guarded or closed position of the paired hooks. The second relatively long hooks which constitute complemental paired hooks are each denoted by the numeral 24. These two hooks are basically the same in construction as the hooks 14 and each hook has a forward and rearward end portions. The forward portion constitutes a shank and it is likewise relatively thin highly flexible and pliant and responsive to pressure. The shank is again referred to as a pressure responsive yieldable tang and is denoted at 26. The terminal forward end portions 18 are superimposed upon diametrically opposite surfaces of the stem 12 between the points of attachment of the aforementioned paired hooks 14. It follows that four hooks provide two pairs of hooks which are equidistant and circumferentially spaced, the inherent tendency of the tangs serving to maintain all of the hooks with the contractable end portions nested in proper paired relationship. The bent portion or bends of the hooks 24 are designated at 28 and the terminal barbed or pointed ends are denoted at 30. It will be observed that with this arrangement the overlapping bends or bent portions 28 are disposed at right angles to the plane of the overlapped bent portions 20.

Figure 4:
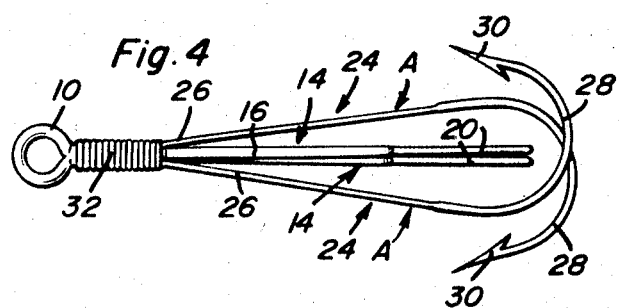
FIG. 4 is a view similar to FIG. 1 showing the barbed bill portion of the hooks of the long pair sprung out to fish ensnaring position when the pressure is applied on the tang in the direction of the arrows A.
Figure 5:
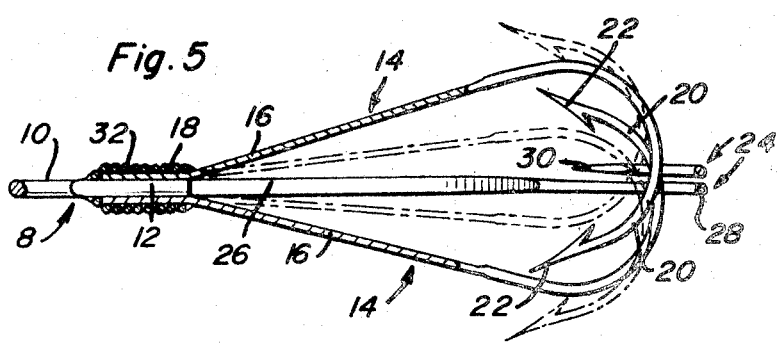
FIG. 5 is a view in section and elevation showing the component parts and their position and relationship when the hooks are sprung out to fish catching position, the section being taken on the plane of the section line 5—5 of FIG. 1.
Figure 6:
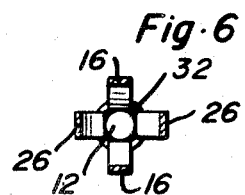
FIG. 6 is a transverse cross-section taken approximately on the plane of the line 6—6 of FIG. 2 looking in he direction of the arrows.

Inasmuch as the hooks are made of spring steel the flat faced elongate shanks or tangs are possessed of the desired lively and sensitive spring action, action which keeps the pointed hooks closed in guarded position. As already pointed out the hooks 14 which constitute one pair are somewhat shorter than the relatively long paired hooks 24. The flat shank portions facilitate gripping of either of the hooks 14 and 24 singly or collectively depending on the manner in which the fish takes the hooks. When the normally contracted or closed hooks are acted upon in the manner suggested in FIGS. 4 and 5 it will be evident that the barbed ends expand or project outwardly in a manner to set the hooks in the mouth of the fish.

In actual practice it has been found desirable to wrap the flattened end portions 18 and this can be done by wrap-around means such as is denoted at 32 and which can be of metal or plastic windings as desired.

It has been found that with prior art adaptations wherein the shank portions of the hooks are circular in cross-section, and even if resilient, are rarely sufficiently sensitive to achieve the desired automatic closing and opening result. It follows, as experience has repeatedly shown, that a paired fishhook construction such as shown and described well serves the purposes for which it has been devised.

Consideration of the views singly and collectively which show the open and closed positions of the paired fishhooks will enable the reader to obtain a clear and comprehensive understanding of the subject matter of the invention and the manner of use and operation. Accordingly, a more extended description is believed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A snagless fishhook construction comprising a rigid relatively short mounting stem, said stem having a rigid eye at a forward end for the attachment thereto of an end of a fishing line, a first pair of relatively short hooks, said hooks being alike in construction and each hook embodying a shank having forward and rearward end portions, said rearward end portions having like return-bends with barbed terminals disposed in turned-in overlapping relationship, said forward end portions being secured to diametrically opposite sides of said mounting stem, a second pair of hooks slightly longer than and complemental to said first pair of hooks and each long hook also embodying forward and rearward end portions having like return-bends with barbed terminals disposed in turned-in overlapping relationship, said forward end portions of said long hooks being secured to diametrically opposite sides of said mounting stem, whereby the four individual hooks are disposed in equidistant circumferentially spaced relationship, each shank being flat-faced and made of flexible bendably pliant material and constituting a pressure responsive tang, wrapping means wrapped tightly and firmly around the forward end portions and completely enclosing and securing the said end portions to said stem, said tangs being yieldingly responsive to pressure which is applied when a fish takes the hook and exerts mouth closing pressure on said tangs, whereby the overlapped portions of the hooks are projected in a manner to set themselves in the jaws of the fish.

* * * * *